United States Patent
Zhu et al.

(10) Patent No.: US 9,239,422 B2
(45) Date of Patent: Jan. 19, 2016

(54) LIGHT GUIDE PLATE WITH BLUNT EDGES

(71) Applicant: Apple Inc., Cupertino, CA (US)

(72) Inventors: Xinyu Zhu, Cupertino, CA (US); Po-Wen Chiu, Cupertino, CA (US); Jun Qi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 14/049,114

(22) Filed: Oct. 8, 2013

(65) Prior Publication Data

US 2014/0176868 A1    Jun. 26, 2014

Related U.S. Application Data

(60) Provisional application No. 61/739,931, filed on Dec. 20, 2012.

(51) Int. Cl.
*G02F 1/1335* (2006.01)
*F21V 8/00* (2006.01)
*B29D 11/00* (2006.01)

(52) U.S. Cl.
CPC ........ *G02B 6/0093* (2013.01); *B29D 11/00663* (2013.01); *G02F 1/133615* (2013.01)

(58) Field of Classification Search
CPC ..................... G02F 1/133615; G02B 6/0038
USPC .............................................. 349/65; 362/615
See application file for complete search history.

(56) References Cited

U.S. PATENT DOCUMENTS

| | | |
|---|---|---|
| 4,812,830 A | 3/1989 | Doering |
| 5,422,751 A | 6/1995 | Lewis et al. |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 5,988,827 A | 11/1999 | Lee |
| 6,061,231 A | 5/2000 | Crockett |
| 6,071,616 A | 6/2000 | Sulzbach et al. |
| 6,188,391 B1 | 2/2001 | Seely et al. |
| 6,280,885 B1 | 8/2001 | Gordon |
| 6,310,610 B1 | 10/2001 | Beaton et al. |

(Continued)

FOREIGN PATENT DOCUMENTS

| | | |
|---|---|---|
| CN | 1987596 A | 6/2007 |
| JP | Hei5-142538 | 6/1993 |

(Continued)

*Primary Examiner* — Thanh-Nhan P Nguyen
(74) *Attorney, Agent, or Firm* — Treyz Law Group, P.C.; Kendall P. Woodruff

(57) ABSTRACT

Electronic devices may include displays. A display may include display layers having an array of display pixels and a backlight unit that provides backlight illumination to the display pixels. The backlight unit may include a light guide plate that distributes light across the display layers and a stack of optical films that may be used to enhance backlight performance. The optical films may be interposed between the light guide plate and the display layers. The light guide plate may be provided with one or more rounded edges formed from curved surfaces and/or one or more beveled edges formed from chamfered surfaces. Providing the light guide plate with rounded or beveled edges may minimize abrasive contact between the light guide plate and the adjacent optical films. An injection molding tool may be used to mold a light guide plate with rounded or beveled edges.

18 Claims, 14 Drawing Sheets

(56) References Cited

U.S. PATENT DOCUMENTS

| | | |
|---|---|---|
| 6,323,846 B1 | 11/2001 | Westerman et al. |
| 6,369,866 B1 | 4/2002 | Rai et al. |
| 6,419,372 B1 | 7/2002 | Shaw et al. |
| 6,690,387 B2 | 2/2004 | Zimmerman et al. |
| 6,738,118 B2 | 5/2004 | Hwang et al. |
| 6,753,843 B2 | 6/2004 | Wang |
| 6,753,937 B2 | 6/2004 | Grupp |
| 7,015,894 B2 | 3/2006 | Morohoshi |
| 7,071,927 B2 | 7/2006 | Blanchard |
| 7,077,554 B2 | 7/2006 | Kim et al. |
| 7,184,064 B2 | 2/2007 | Zimmerman et al. |
| 7,195,392 B2 | 3/2007 | Shiau |
| 7,663,607 B2 | 2/2010 | Hotelling et al. |
| 7,819,572 B2 | 10/2010 | Matsumoto |
| 7,948,573 B2 | 5/2011 | Kang et al. |
| 8,031,290 B2 | 10/2011 | Fu |
| 8,051,980 B2 | 11/2011 | Tai et al. |
| 8,154,680 B2 | 4/2012 | Doyle et al. |
| 8,390,759 B2 | 3/2013 | Doyle et al. |
| 8,558,977 B2 | 10/2013 | Gettemy et al. |
| 2002/0114152 A1 | 8/2002 | Fujino et al. |
| 2002/0145762 A1 | 10/2002 | Hsu et al. |
| 2003/0164894 A1 | 9/2003 | Hsu et al. |
| 2004/0114345 A1* | 6/2004 | Kim et al. ............... 362/31 |
| 2006/0026521 A1 | 2/2006 | Hotelling et al. |
| 2006/0158511 A1 | 7/2006 | Harrold et al. |
| 2006/0164863 A1 | 7/2006 | Chang et al. |
| 2006/0197753 A1 | 9/2006 | Hotelling |
| 2007/0030420 A1 | 2/2007 | Jang |
| 2007/0127261 A1 | 6/2007 | An et al. |
| 2008/0198627 A1 | 8/2008 | Matsumoto |
| 2008/0204624 A1 | 8/2008 | Fu |
| 2009/0185098 A1 | 7/2009 | Bae et al. |
| 2011/0255023 A1 | 10/2011 | Doyle et al. |
| 2011/0285661 A1 | 11/2011 | Hotelling |
| 2012/0063167 A1 | 3/2012 | Ozawa et al. |
| 2012/0214417 A1 | 8/2012 | Woo et al. |
| 2012/0327324 A1 | 12/2012 | Martisauskas et al. |
| 2013/0051076 A1* | 2/2013 | Mizuno et al. ............ 362/613 |
| 2013/0063978 A1 | 3/2013 | Gettemy et al. |

FOREIGN PATENT DOCUMENTS

| | | |
|---|---|---|
| JP | 2004-61622 | 2/2004 |
| JP | 2008-103301 A | 5/2008 |
| JP | 2008-198540 | 8/2008 |
| KR | 10-2006-0104511 A | 10/2006 |
| KR | 10-2012-0116290 | 10/2012 |
| KR | 10-2012-0125875 | 11/2012 |
| TW | I238910 | 9/2005 |
| TW | M376786 | 3/2010 |

* cited by examiner

LIGHT GUIDE PLATE WITH BLUNT EDGES

This application claims priority to U.S. provisional patent application No. 61/739,931 filed Dec. 20, 2012, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size, weight, electrical grounding, robustness, ease of assembly, and light-tightness are often important considerations in designing electronic devices. If care is not taken, displays may be bulky, may exhibit undesired light reflections, or may be prone to damage during a drop event. The housing of an electronic device can be adjusted to accommodate a bulky display with large borders, but this can lead to undesirable enlargement of the size and weight of the housing and unappealing device aesthetics.

It would therefore be desirable to be able to provide improved ways to provide displays for electronic devices.

SUMMARY

An electronic device may be provided with a display. The display may include a display unit having an array of display pixels and a backlight unit for providing backlight illumination to the display pixels.

The backlight unit may include a light guide plate for distributing light from a light source across the display layers and an optical film stack for enhancing backlight performance. The optical film stack may be interposed between the light guide plate and the display layers.

The light guide plate may have a rectangular shape with four edges. One, two, three, or four of these edges may be blunt edges that minimize abrasive contact between the light guide plate and adjacent optical films such as an adjacent diffuser layer. In one suitable embodiment, a blunt edge may be a rounded edge formed from a curved surface having a radius of curvature of greater than 50 microns. In another suitable embodiment, a blunt edge may be a beveled edge formed from two or more planar surfaces that are angled with respect to one another by an angle of greater than 90 degrees.

The blunt edge may extend along an entire side of the light guide plate from one corner to another or may be formed along only a portion of a side of the light guide plate. In addition to rounded and/or beveled edges, the light guide plate may have vertical sidewall surfaces that extend vertically from an upper surface of the light guide plate to an opposing lower surface of the light guide plate, thereby forming a straight edge. The vertical sidewall surfaces may be on an opposing side of the light guide plate from the curved surfaces that form the rounded edge.

An injection molding tool may be used to mold the light guide plate with the curved surfaces and rounded edges. A polishing tool such as a diamond edge polishing machine may be used to grind and polish the edges of the light guide plate following the injection molding process.

Further features of the invention, its nature and various advantages will be more apparent from the accompanying drawings and the following detailed description of the preferred embodiments.

BRIEF DESCRIPTION OF THE DRAWINGS

FIG. 18 is a diagram showing how a molding tool and a grinding tool may be used in forming a light guide plate having blunt edges and showing how the light guide plate and additional device parts such as a housing are assembled to

DETAILED DESCRIPTION

Electronic devices may include displays. The displays may be used to display images to a user. Illustrative electronic devices that may be provided with displays are shown in FIGS. 1, 2, and 3.

Figure 1:
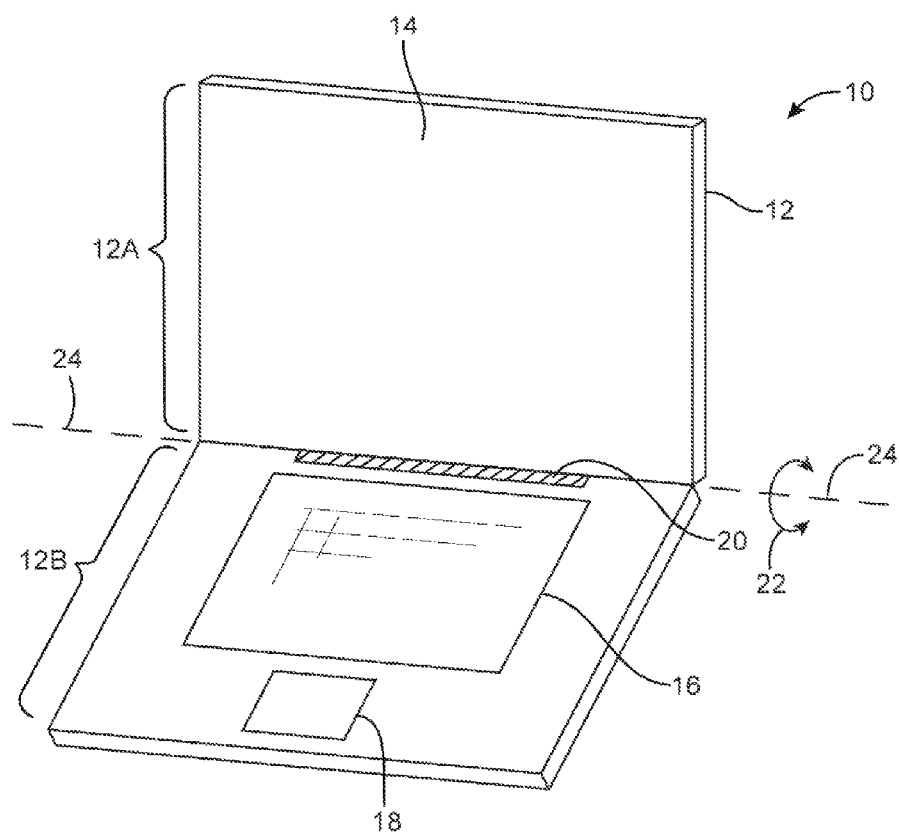
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
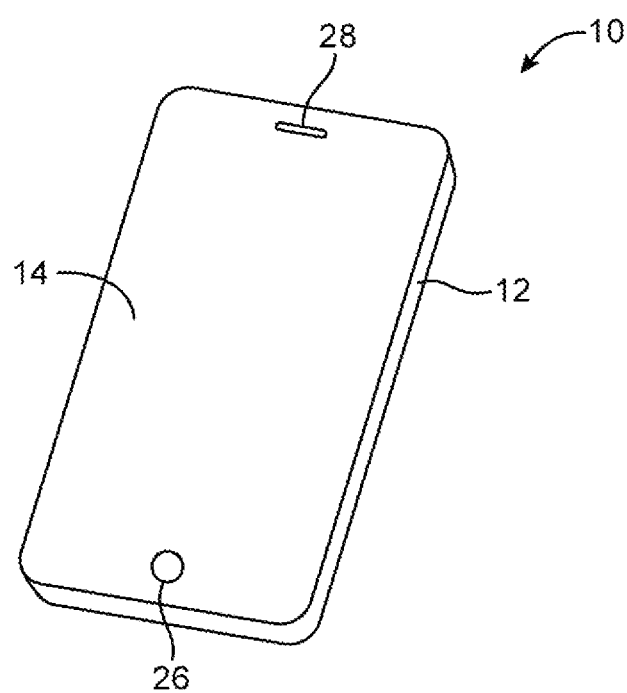
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
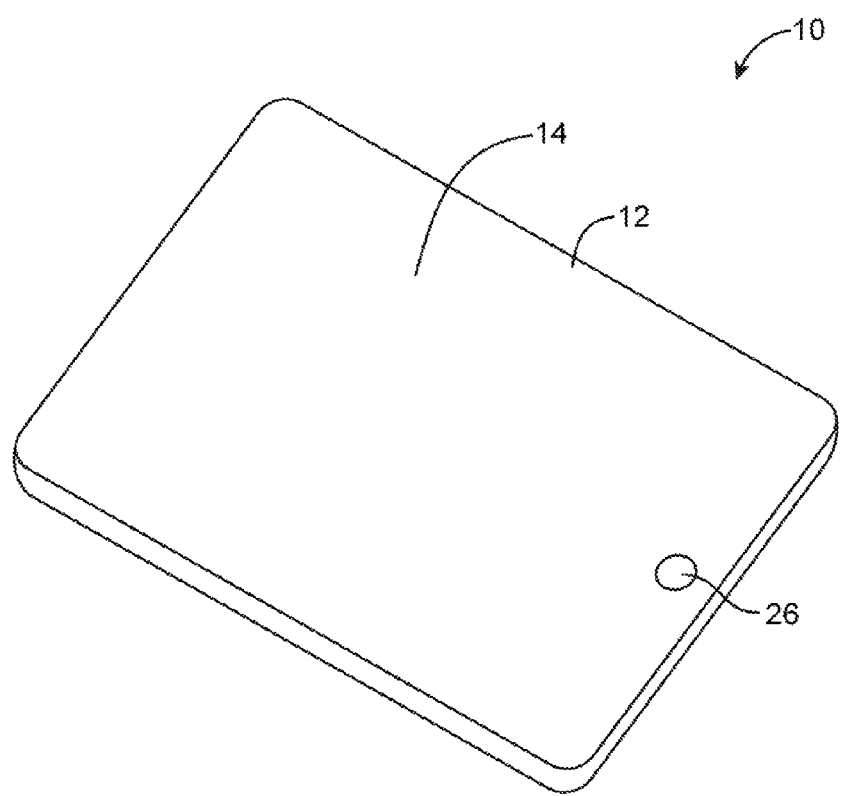
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

Figure 4:
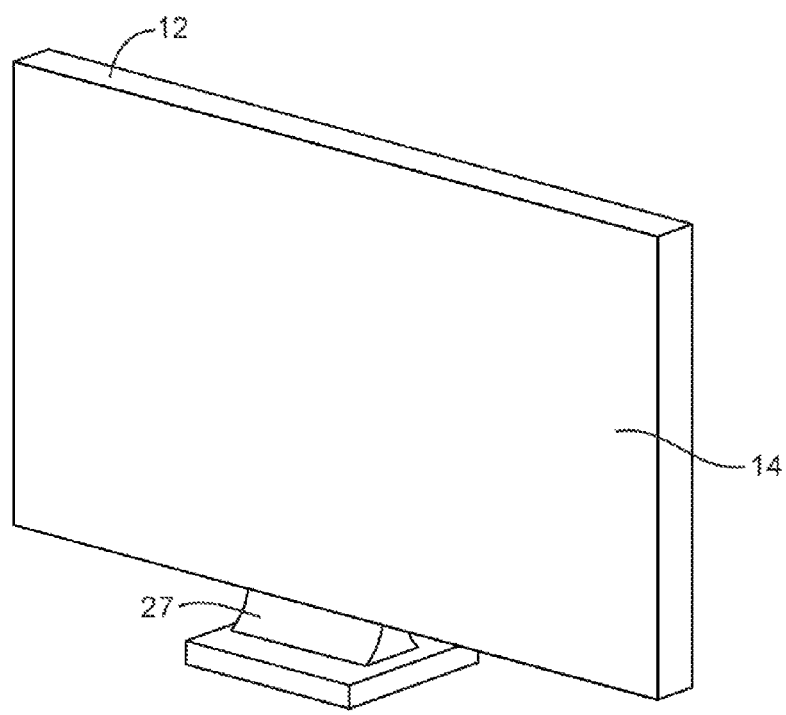
FIG. 4 is a perspective view of an illustrative electronic device such as a computer display with a display in accordance with an embodiment of the present invention.

FIG. 4 shows an illustrative configuration for electronic device 10 in which device 10 is a computer display or a computer that has been integrated into a computer display. With this type of arrangement, housing 12 for device 10 is mounted on a support structure such as stand 27. Display 14 is mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined or cast aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 5:
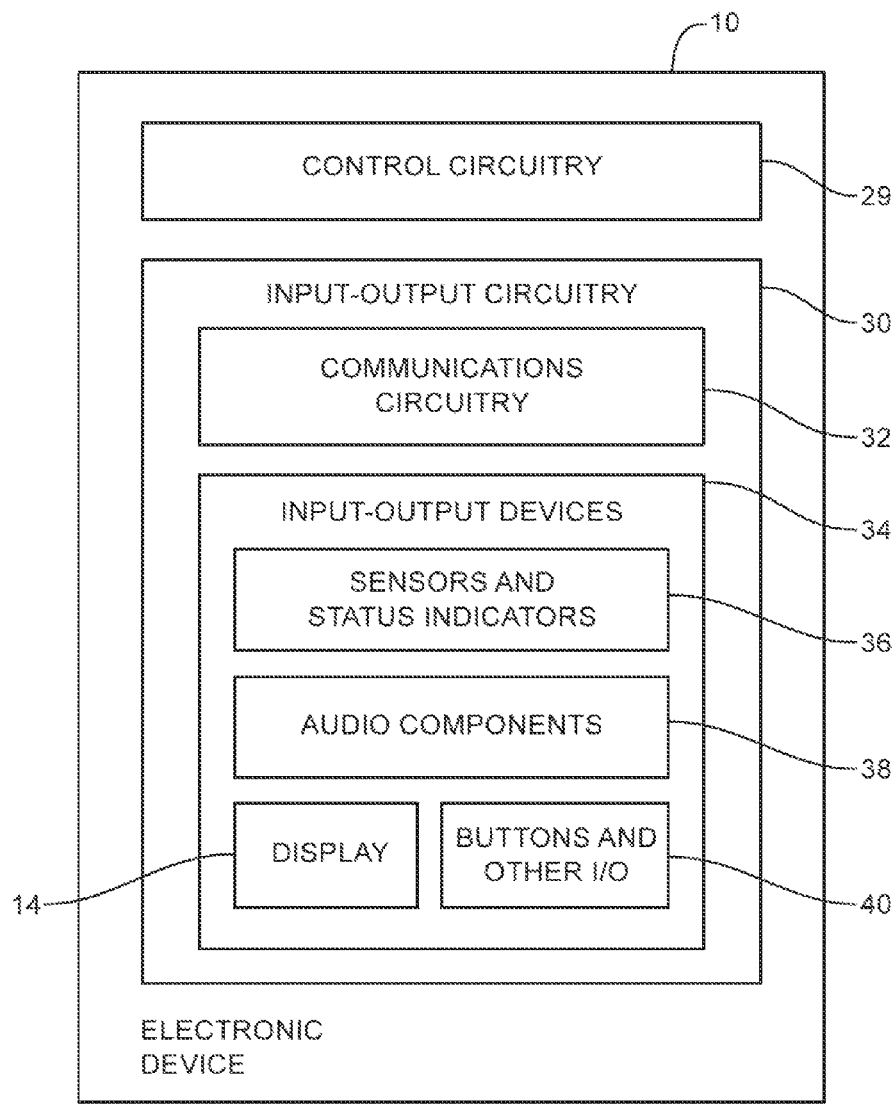
FIG. 5 is a schematic diagram of an illustrative electronic device with a display in accordance with an embodiment of the present invention.

A schematic diagram of an illustrative configuration that may be used for electronic device 10 is shown in FIG. 5. As shown in FIG. 5, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10.

Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 6:
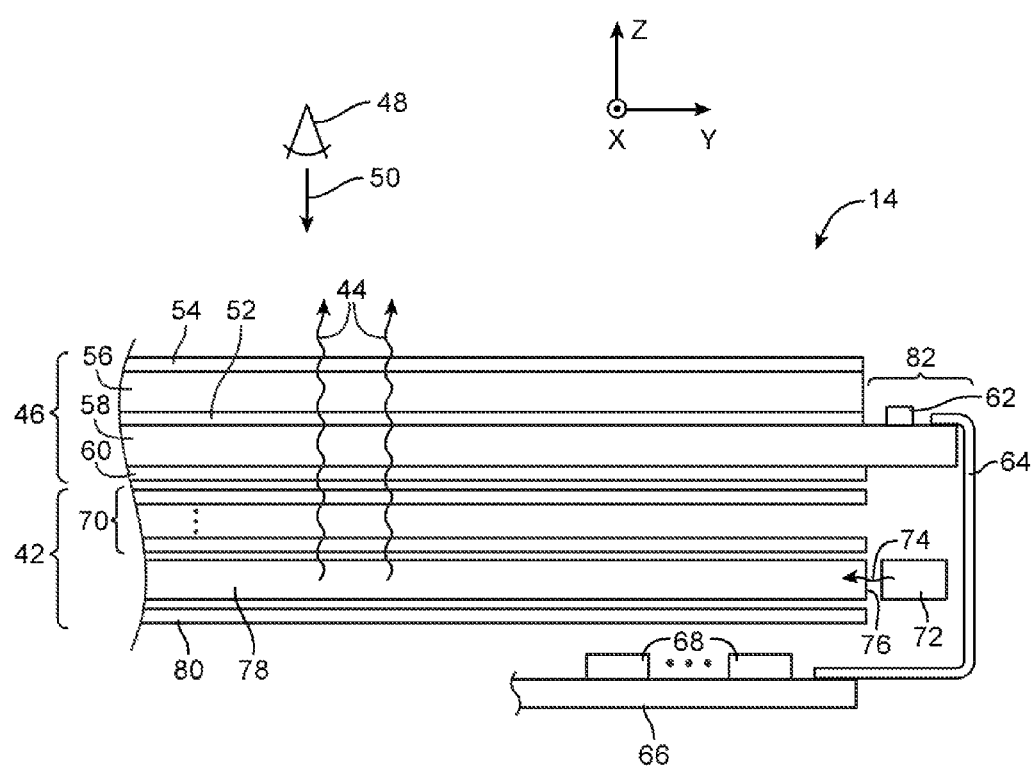
FIG. 6 is a cross-sectional side view of illustrative display layers and backlight structures in accordance with an embodiment of the present invention.

A cross-sectional side view of an illustrative configuration that may be used for display 14 of device 10 (e.g., for display 14 of the devices of FIG. 1, FIG. 2, FIG. 3, or FIG. 4 or other suitable electronic devices) is shown in FIG. 6. As shown in FIG. 6, display 14 may include backlight structures such as backlight unit 42 for producing backlight 44. During operation, backlight 44 travels outwards (vertically upwards in dimension Z in the orientation of FIG. 6) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted to chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54. If desired, upper polarizer layer 54 may be attached to an outer cover layer such as cover layer 49 (FIG. 6).

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates. Display layers 46 may sometimes collectively be referred to herein as a "display cell" or a "display unit."

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 6) may be used to generate information to be displayed on display 14 (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film transistor layer driver ledge 82 or elsewhere in device 10. A flexible printed circuit cable such as flexible printed circuit 64 may be used in routing signals between printed circuit 66 and thin-film transistor layer 58. If desired, display driver integrated circuit 62 may be mounted on printed circuit 66 or flexible printed circuit 64.

Printed circuit 66 may be formed from a rigid printed circuit board (e.g., a layer of fiberglass-filled epoxy) or a flexible printed circuit (e.g., a flexible sheet of polyimide or other flexible polymer layer). However, these examples are merely illustrative. If desired printed circuits 64 and 66 may be formed from a combination of rigid and flexible printed circuit layers (e.g., printed circuit 66 may be formed from a rigid printed circuit board with a layer of flexible printed circuitry that extends from an edge of printed circuit 66 to form flexible printed circuitry 64 that attaches to thin-film transistor layer 58).

Backlight structures 42 may include a backlight light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed laterally in dimensions X and Y throughout light guide plate 78 due to the principal of total internal reflection. Light guide plate 78 may include light-scattering features such as pits or bumps or other light-scattering structures. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 6, optical films 70 and reflector 80 may have a matching rectangular footprint.

If care is not taken, the layers in a display such as optical film layers may be susceptible to damage. For example, conventional light guide plates have sharp edges around the periphery of the light guide plate that can scratch optical film layers such as an adjacent diffuser layer. This type of abrasive contact between sharp edges of the light guide plate and the adjacent optical films can produce dust particles which in turn can damage other optical films in the display.

To minimize abrasive contact between light guide plate 78 and optical films 70, light guide plate 78 may have one or more blunt edges. A cross-sectional side view of backlight structures 46 in which light guide plate 78 is provided with blunt edges is shown in FIG. 7.

Figure 7:
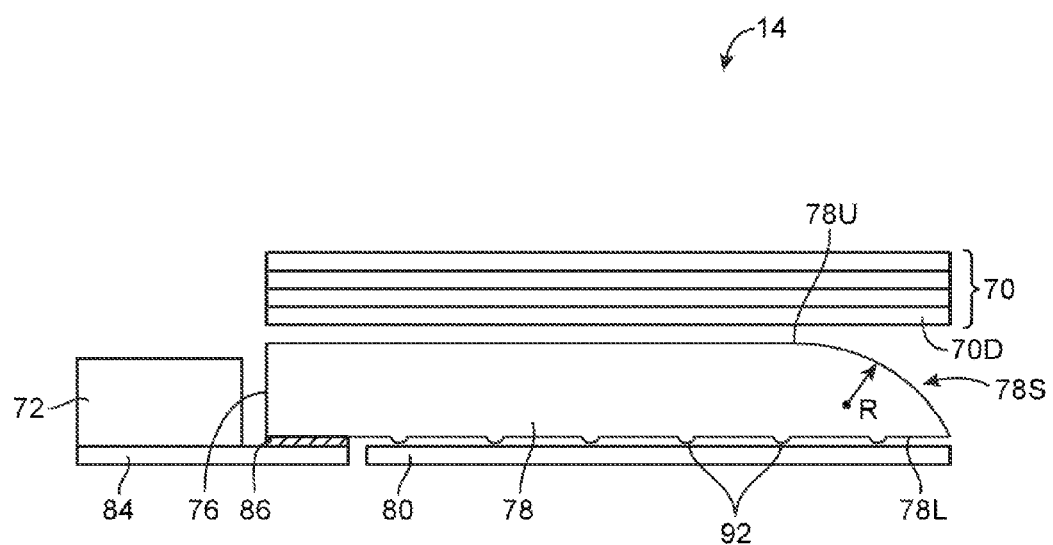
FIG. 7 is a cross-sectional side view of illustrative display layers and backlight structures showing how a light guide plate may have rounded edges in accordance with an embodiment of the present invention.

As shown in FIG. 7, light guide plate 78 may be interposed between reflector 80 and optical films 70. A light source such as light source 72 may emit light into edge surface 76 of light guide plate 78. Light-scattering features 92 (e.g., pits, bumps, or other light-scattering structures) may help scatter light upwards through display layers in display 14. Light-scattering features 92 may be formed on lower surface 78L (as shown in FIG. 7) or may be formed on opposing upper surface 78U.

Light source 72 may, for example, be a strip of light-emitting diodes that runs along edge surface 76 of light guide plate 78. Light-emitting diodes 72 may be mounted on a substrate such as substrate 84. Substrate 84 may be formed from a flexible printed circuit substrate material such as polyimide or a sheet of other flexible polymer or may be formed from a rigid printed circuit board material (e.g., fiberglass-filled epoxy material such as FR4). Light guide plate 78 may be attached to substrate 84 using adhesive such as adhesive 86. Adhesive 86 may be pressure-sensitive adhesive, light-cured adhesive, liquid adhesive, or other suitable adhesive.

Light guide plate 78 may have an upper surface such as upper surface 78U and a lower surface such as lower surface 78L. Upper surface 78U may be adjacent to optical films 70 (e.g., adjacent to a diffuser layer such as diffuser layer 70D in optical films 70), whereas lower surface 78L may be adjacent to reflector 80. Upper surface 78U may have a curved portion such as curved portion 78S that joins the planar portion of upper surface 78U with planar lower surface 78L. Curved surface 78S may, for example, have a radius of curvature R of greater than 10 microns, greater than 50 microns, greater than 100 microns, greater than 500 microns, or less than 500 microns. Curved surface 78S of light guide plate 78 may form a blunt edge that minimizes abrasive contact between light guide plate 78 and optical films 70.

Figure 8:
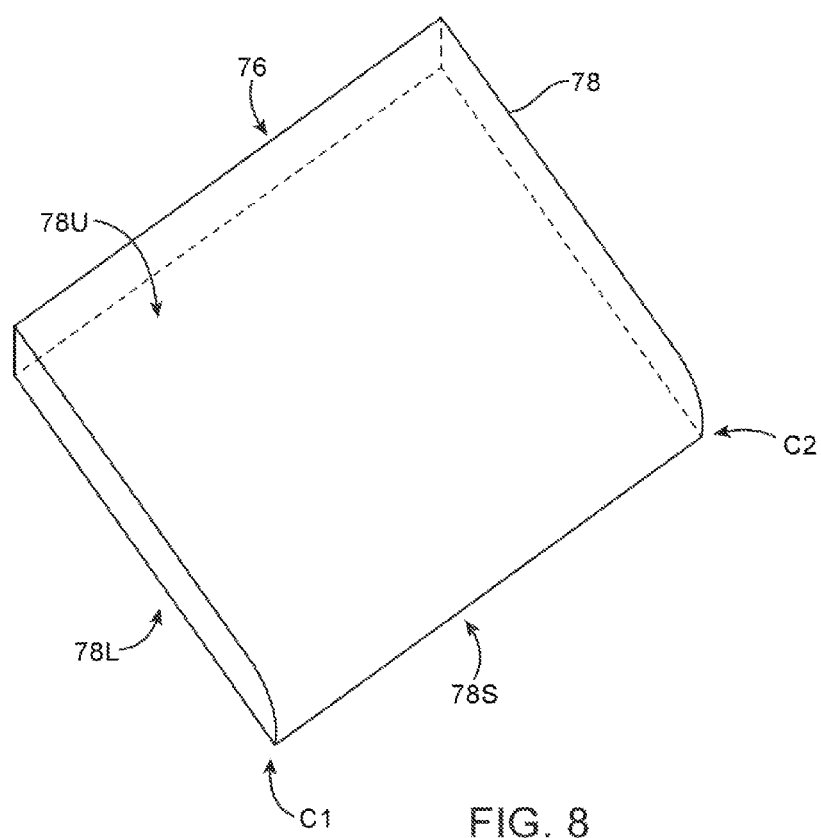
FIG. 8 is a perspective view of an illustrative light guide plate having a rounded edge on one side and a straight edge on an opposing side in accordance with an embodiment of the present invention.

If desired, light guide plate 78 may have a combination of blunt edges such as blunt edge 78S and straight edges such as straight edge 76. As shown in FIG. 8, for example, light guide plate 78 has a rectangular shape with four edges. One, two, three, or all four of these edges may be blunt edges formed from curved or beveled surfaces. In the example of FIG. 8, edge 78S is a blunt edge formed from a curved surface. Opposing edge 76, on the other hand, is a straight edge. If desired, blunt edge 78S may extend along an entire side of light guide plate 78 from corner C1 to corner C2 or may extend only partially along a side of light guide plate 78.

Edge 76 may be formed from a flat vertical sidewall surface that extends along an entire side of light guide plate 78 or edge 76 may be formed from portions with curved surfaces and portions with vertical sidewall surfaces. In configurations where edge 76 is used as a light coupling edge for receiving light from light source 72 (FIG. 7), edge 76 may have light coupling regions with surface variations that facilitate light coupling. For example, edge 76 may have light coupling regions that include vertically extending corrugations or other surface textures (e.g., curved surfaces, scalloped surfaces, sawtooth surfaces, angled surfaces, a combination of these surfaces, etc.). If desired, edge 76 may have vertical sidewall surfaces (e.g., sidewall surfaces that are oriented perpendicularly to upper surface 78U and lower surface 78L of light guide plate 78) interspersed among other surface regions (e.g., curved edge segments, beveled edge segments, other blunt edge segments, etc.).

A "blunt" edge may refer to an edge formed from a curved surface (e.g., a surface having a radius of curvature R of greater than 50 microns) or may refer to an edge with an interior angle of greater than 90 degrees, for example. A "straight" edge may refer to an edge with an interior angle of approximately 90 degrees, for example. Edge 76 in the example of FIG. 7 is defined by an interior angle of approximately 90 degrees and is sometimes referred to as a flat or square edge. If desired, light guide plate 78 may have one blunt edge and three straight edges, two blunt edges and two straight edges, three blunt edges and one straight edge, the entire periphery of light guide plate 78 may have blunt edges, etc. The example of FIG. 8 is merely illustrative.

Different surface geometries may be used in forming blunt edges such as edge 78S of light guide plate 78. Illustrative examples of different surface geometries that may be used to form blunt edges such as edge 78S are shown in FIGS. 9-13.

Figure 9:
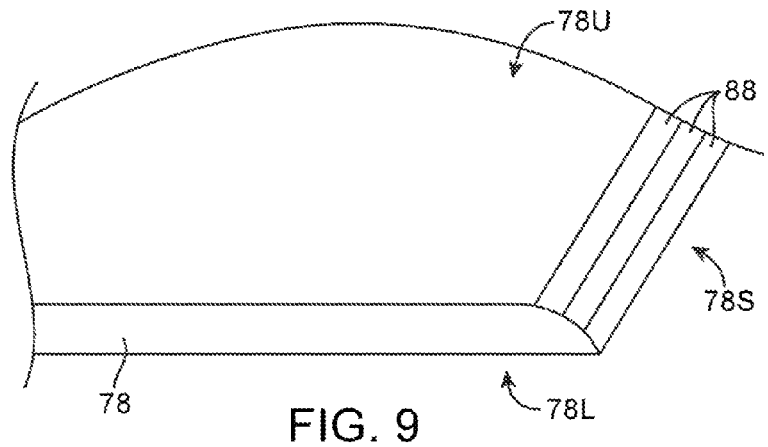
FIG. 9 is a perspective view of a portion of an illustrative light guide plate having blunt edges such as a chamfered edge in accordance with an embodiment of the present invention.

In the example of FIG. 9, blunt edge 78S of light guide plate 78 is formed from a chamfered surface (sometimes referred to as a beveled surface). With this type of configuration, a series of planar surfaces 88 that are angled with respect to one another (e.g., by an interior angle of greater than 90 degrees) may join upper surface 78U with lower surface 78L of light guide plate 78. In the example of FIG. 9, three planar surfaces 88 are used to join upper surface 78U with lower surface 78L of light guide plate 78. This is, however, merely illustrative. If desired, there may be more than three surfaces 88 or less than three surfaces 88 joining upper surface 78U with lower surface 78L. For example, a single planar surface 88 (e.g., angled with respect to planar surface 78U by an interior angle of greater than 90 degrees) may be used to form a beveled edge that joins upper surface 78U with lower surface 78L.

Figure 10:
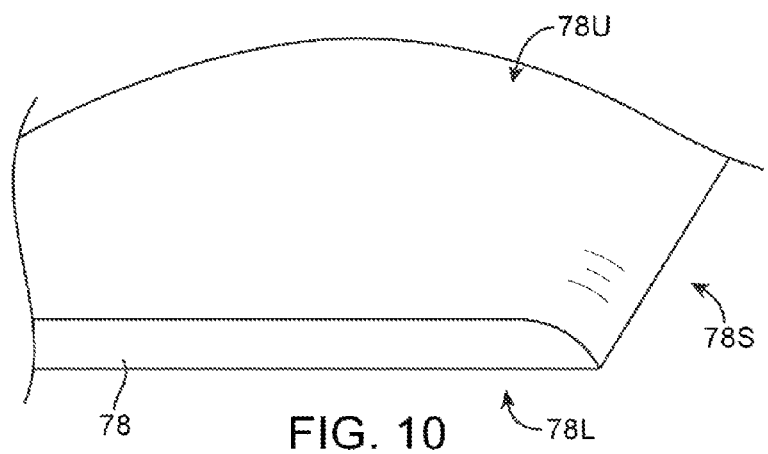
FIG. 10 is a perspective view of a portion of an illustrative light guide plate having blunt edges such as a demi bullnose edge in accordance with an embodiment of the present invention.

In the example of FIG. 10, blunt edge 78S of light guide plate 78 is formed from a rounded surface. This type of edge is sometimes referred to as a half bullnose, a demi bullnose, or eased edge. With this type of configuration, a smooth curved surface may join planar upper surface 78U of light guide plate 78 with planar lower surface 78L of light guide plate 78. Curved surface 78S may, for example, take the place of a planar sidewall at an edge of light guide plate 78.

Figure 11:
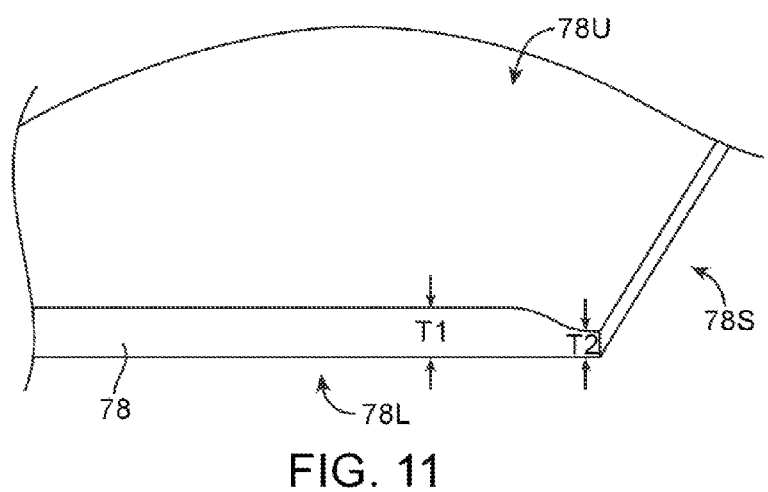
FIG. 11 is a perspective view of a portion of an illustrative light guide plate having blunt edges such as a tapered edge in accordance with an embodiment of the present invention.

In the example of FIG. 11, blunt edge 78S of light guide plate 78 is formed from a curved surface that forms a tapered edge. The central portion of light guide plate 78 may have a first thickness T1 in between upper surface 78U and lower surface 78L. The edge portion at edge 78S may have a second thickness T2 less than thickness T1. The curved surface of tapered edge 78S of FIG. 11 may transition gradually from the central portion to the edge portion such that abrasive contact between light guide plate 78 and adjacent optical films 70 (FIG. 7) is minimized.

Figure 12:
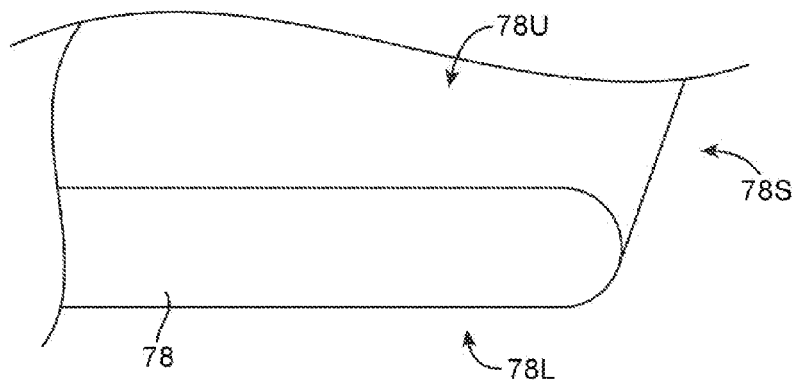
FIG. 12 is a perspective view of a portion of an illustrative light guide plate having blunt edges such as a full bullnose edge in accordance with an embodiment of the present invention.

In the example of FIG. 12, blunt edge 78S of light guide plate 78 is formed from a curved surface that forms a full bullnose edge. With this type of configuration, edge 78S has a c-shaped cross section in which upper surface 78U and lower surface 78L are joined by a smooth c-shaped curved surface 78S.

Figure 13:
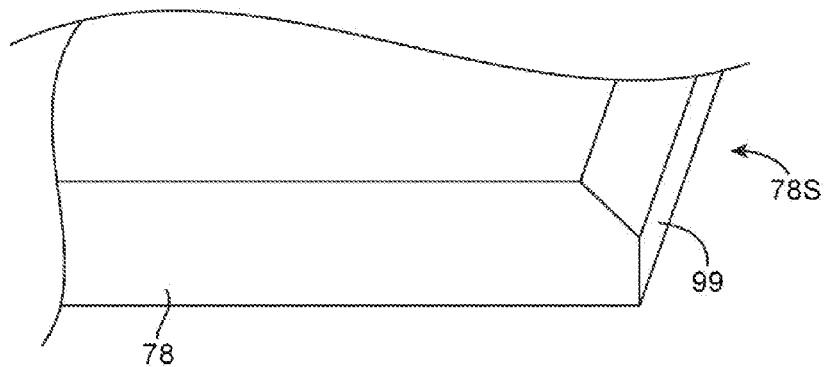
FIG. 13 is a perspective view of a portion of an illustrative light guide plate having blunt edges such as a beveled edge in accordance with an embodiment of the present invention.

In the example of FIG. 13, blunt edge 78S of light guide plate 78 is formed from a beveled edge (e.g., a half-beveled edge, a quarter-beveled edge, etc.). The example of FIG. 13 is similar to that of FIG. 9 except that the example of FIG. 13 includes a vertical side wall portion 99.

Figure 14:
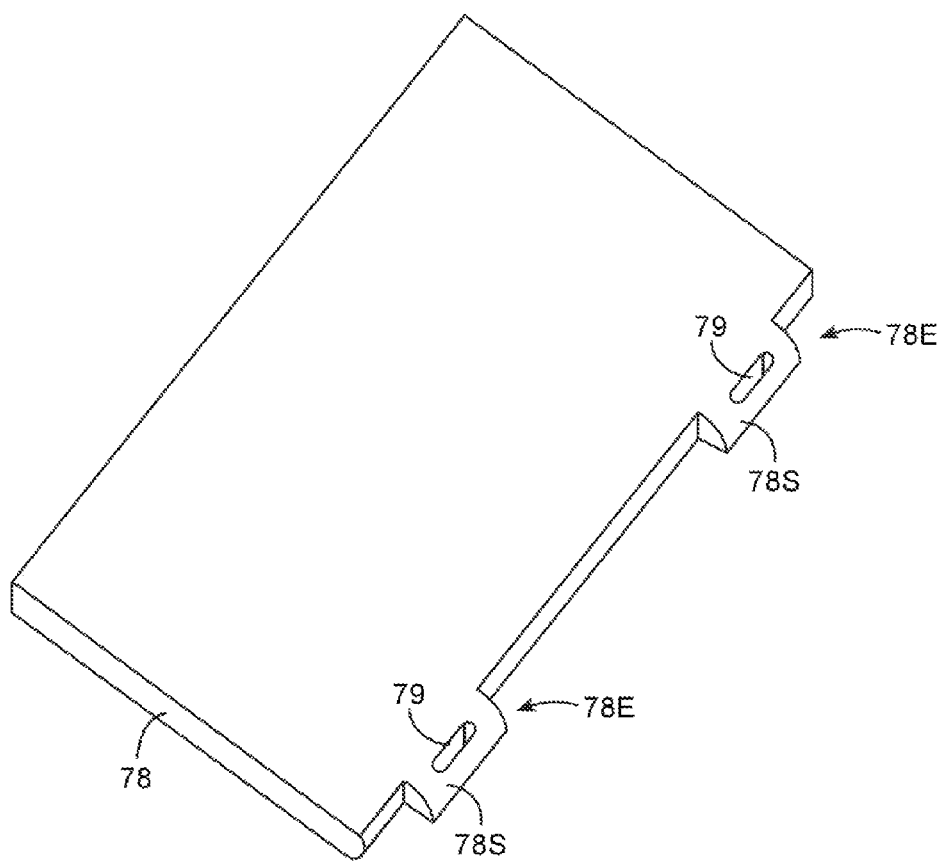
FIG. 14 is a perspective view of an illustrative light guide plate having alignment features and blunt edges in accordance with an embodiment of the present invention.

In some configurations, light guide plate 78 may have alignment features that help align and secure light guide plate 78 within housing 12 of device 10. For example, as shown in FIG. 14, light guide plate 78 may have alignment structures 78E that protrude out laterally from light guide plate 78. Alignment structures 78E (sometimes referred to as protrusions or tabs) may be received by corresponding alignment structures in housing 12 of device 10 or in other structures surrounding display 14. If desired, light guide plate alignment structures 78E may have engagement features such as openings 79 for receiving corresponding engagement features such as posts or protrusions to hold light guide plate 78 in place within device 10.

The example of FIG. 14 in which light guide plate 78 has two alignment structures 78E formed on a single edge of light guide plate 78 is merely illustrative. If desired, there may be one or more alignment structures 78E on one, two, three, or all four sides of light guide plate 78.

If desired, light guide plate alignment structures 78E may have blunt edges 78S to minimize abrasive contact between alignment structures 78E and adjacent optical films 70 (FIG. 7). Blunt edges of alignment structures 78E may take the form of any of the illustrative blunt edges shown in FIGS. 9-13.

Figure 15:
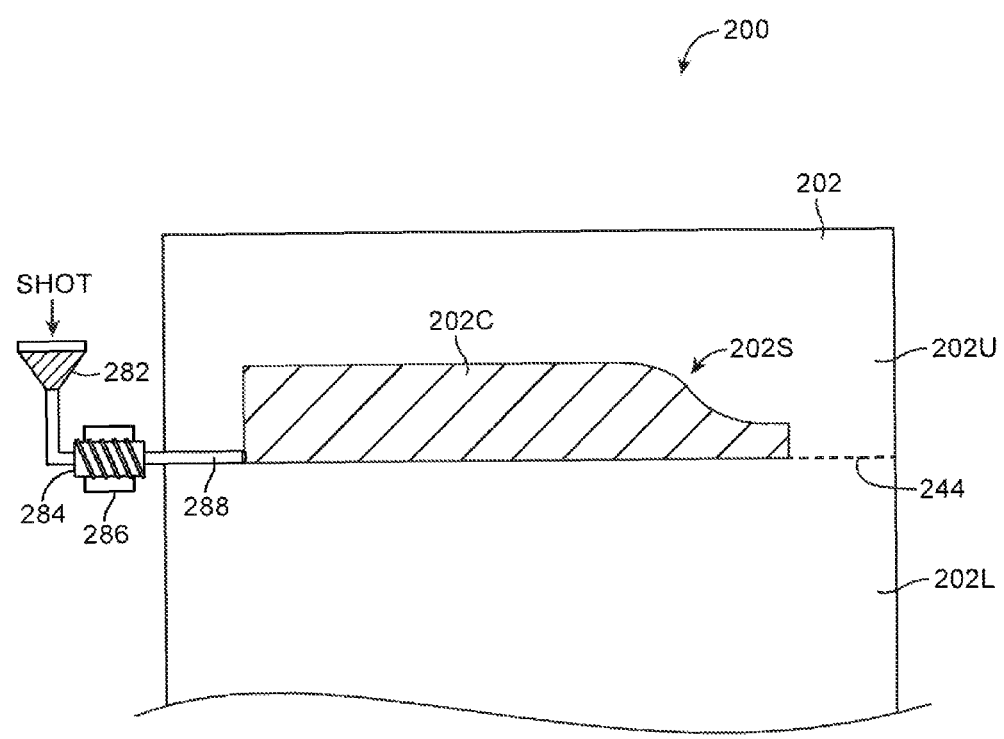
FIG. 15 is a diagram of an illustrative injection molding system that may be used in forming light guide plates having blunt edges in accordance with an embodiment of the present invention.

An illustrative injection molding system that may be used to mold light guide plate 78 with one or more blunt edges 78S is shown in FIG. 15. As shown in FIG. 15, injection molding system 200 may include a mold such as mold 202. Mold 202 may include a mold cavity 202C. Mold cavity 202C may have the negative shape of light guide plate 78 with blunt edge 78S such that, when filled with plastic, the resulting part has the shape of light guide plate 78 with blunt edge 78S. As shown in FIG. 15, upper mold 202C has curved surface 202S that helps form blunt edges 78S of light guide plate 78.

As shown in FIG. 15, a shot of pelletized thermoplastic material (e.g., thermoplastic granules or "resin") may be added to a hopper such as hopper 282. The material may be gravity fed into a screw-type plunger such as plunger 284. The heat generated by heating unit 286 and the rotation of the screw in plunger 284 may result in elevated temperatures and a shearing action on the thermoplastic pellets that causes the pellets to melt into molten plastic. Screw rotation in plunger 284 may push the molten plastic towards nozzle 288 and into mold cavity 202C.

When mold 202 has been completely filled, the molten plastic may be cooled. When the plastic has solidified, mold 202 may be removed (e.g., mold 202 may be opened by separating upper portion 202U from lower portion 202L along line 244).

The plastic that solidifies within cavity 202C may form light guide plate 78 with blunt edge 78S. If desired, additional processing operations may be performed to light guide plate 78. For example, following the injection molding process that forms light guide plate 78, the edges of light guide plate 78 such as edge 78S (and other edges of light guide plate 78, if desired) may be grinded and/or polished. Illustrative equipment that may be used to modify edge surfaces such as edge surface 78S of light guide plate 78 is shown in FIGS. 16 and 17.

Figure 16:
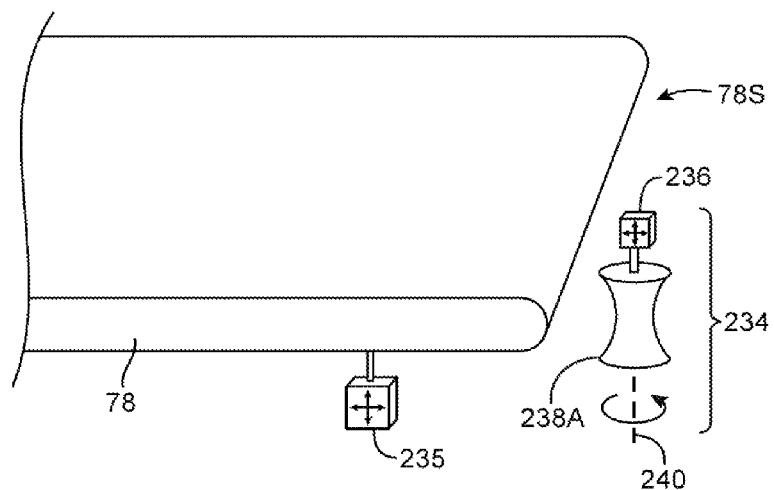
FIG. 16 is a diagram of illustrative equipment that may be used to modify edges of a light guide plate in accordance with an embodiment of the present invention.

As shown in FIG. 16, equipment 234 (e.g., a diamond edge polishing machine, an edge grinding tool, an edge polishing tool, a laser cutting tool, a milling tool, a machining tool such as a drill bit, milling machine cutter, or other cutting tool, etc.) may include computer-controlled positioner 236 and machining tool head 238A. Head 238A has a surface profile that is configured to grind and/or polish edge surface 78S to form a rounded surface with a c-shaped cross section (e.g., a full bullnose edge). During operation, positioner 236 rotates machining tool head 238A (e.g., using a motor) about axis 240 while moving tool 238A along edge 78S of light guide plate 78, thereby machining edge surface 78S of light guide plate 78 into a desired shape. If desired, different arrangements of positioners may be used. As an example, computer-controlled positioner 235 may be used to move light guide plate 78 during edge polishing operations while equipment 234 remains in a fixed position.

Figure 17:
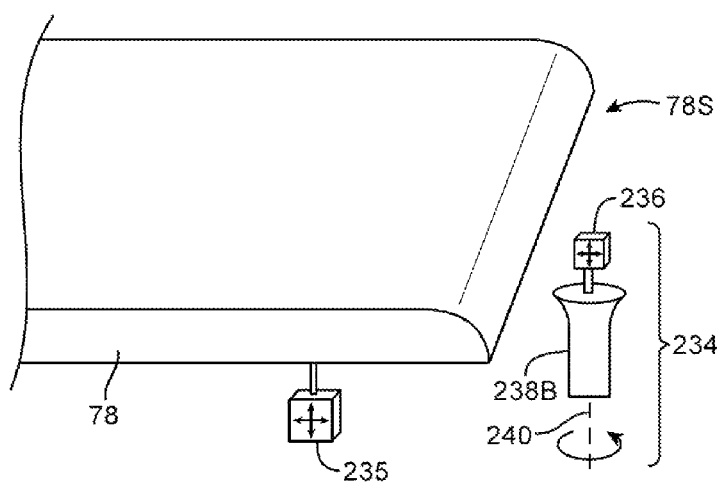
FIG. 17 is a diagram of illustrative equipment that may be used to modify edges of a light guide plate in accordance with an embodiment of the present invention.

In the illustrative example of FIG. 17, equipment 234 includes machining tool head 238B. Head 238B has a surface profile that is configured to grind and/or polish edge surface 78S to form a partially rounded surface (e.g., a demi bullnose edge or a half bullnose edge having a curved surface portion and a planar surface portion).

If desired, equipment 234 may be used to modify (e.g., grind and/or polish) all four edges of light guide plate 78 or equipment 234 may be used to modify one or more of the edges of light guide plate 78. The machining tool head that is used to modify a given edge of light guide plate 78 may have a surface profile corresponding to the desired surface profile of that edge. For example, in arrangements where light guide plate 78 has a combination of rounded and straight edges, a combination of machining tool heads having different surface profiles may be used to treat the four edges of light guide plate 78 (e.g., machining tool heads with flat surface profiles, machining tool heads with curved surface profiles, etc.).

Figure 18:
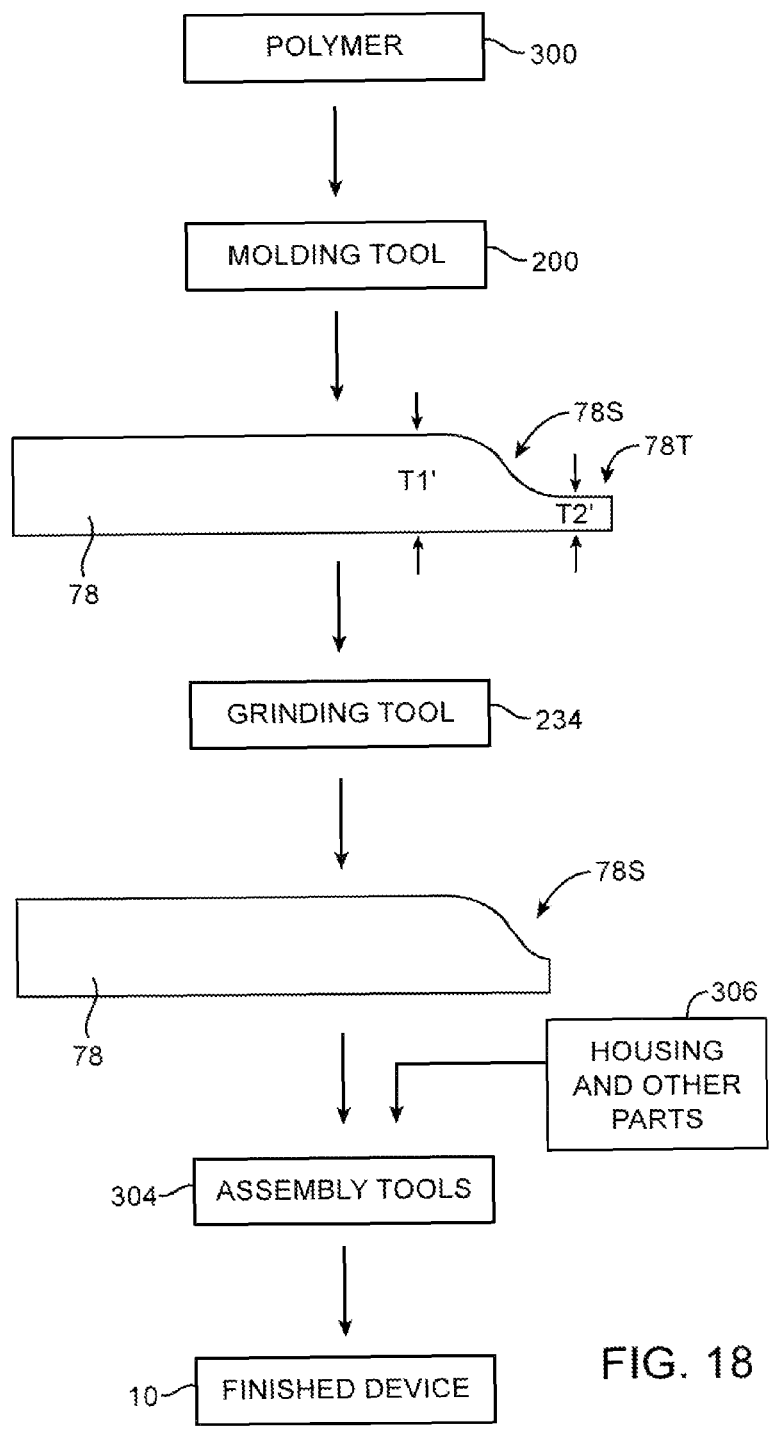

A flow chart of illustrative steps involved in forming light guide plate 78 using the injection molding tool of FIG. 15 and equipment 234 of FIGS. 16 and 17 is shown in FIG. 18.

As shown in FIG. 18, equipment such as molding tool 200 may receive polymer material 300 (e.g., a clear resin such as polymethyl methacrylate resin or other acrylic resin, a polycarbonate resin, etc.). Molding tool 200 may be used in molding polymer 300 into light guide plate 78 having blunt edge 78S. In some configurations, the resulting part formed by molding tool 200 may have a tail portion such as tail portion 78T at edge 78S. Light guide plate 78 may taper from a first thickness T1' at the central portion of light guide plate 78 to a second thickness T2' at tail portion 78T of light guide plate 78. The blunt edge formed by curved surface 78S may minimize abrasive contact with and scratches on adjacent optical films 70 in display 14 of device 10.

Following formation of light guide plate 78 having blunt edge 78S, light guide plate 78 may be grinded and polished using a grinding tool such as grinding tool 234. Grinding tool 234 may be used to grind down and thereby remove all or a portion of tail portion 78T at edge 78S. Grinding tool 234 may also be used in shaping and polishing one or more edges of light guide plate 78 to form smooth edges. For example, any plastic that seeps between upper mold 202U and lower mold 202L (e.g., at interface 244) during the injection molding process (sometimes referred to as flash or burrs) may be removed during the grinding/polishing step of FIG. 18. If desired, all four edges of light guide plate 78 may be polished using grinding tool 234.

Following grinding and polishing operations, light guide plate 78, other layers of display 14, housing 12, and other parts in electronic device 10 (shown as parts 306 in FIG. 18) may be assembled using assembly equipment 304, thereby forming finished electronic device 10. This may include, for example, attaching light guide plate 78 to light-emitting diode substrate 84 of FIG. 7.

The foregoing is merely illustrative of the principles of this invention and various modifications can be made by those skilled in the art without departing from the scope and spirit of the invention. The foregoing embodiments may be implemented individually or in any combination.

What is claimed is:

1. A backlight assembly configured to provide backlight illumination to display layers in a display, comprising:
   a light guide plate having a surface from which the backlight illumination is provided to the display layers, wherein the surface has a planar portion and a curved portion and wherein the curved portion forms a rounded edge, wherein the light guide plate has a straight edge on an opposing side of the light guide plate from the rounded edge, and wherein the light guide plate has a vertical sidewall that forms the straight edge;
   at least one optical film adjacent to the surface of the light guide plate; and
   a plurality of light-emitting diodes mounted on a substrate, wherein the light-emitting diodes are configured to emit light into the straight edge and wherein the light guide plate is attached to the substrate.

2. The backlight assembly defined in claim 1 wherein the curved portion of the surface has a radius of curvature of greater than 50 microns.

3. The backlight assembly defined in claim 1 wherein the light guide plate comprises alignment structures and wherein the alignment structures have rounded edges.

4. The backlight assembly defined in claim 1 wherein the light guide plate comprises an injection molded light guide plate.

5. The backlight assembly defined in claim 1 wherein the at least one optical film comprises a diffuser layer.

6. The backlight assembly defined in claim 1 wherein the light guide plate comprises polymethyl methacrylate.

7. A method, comprising:
   with an injection molding tool, molding a rectangular light guide plate with four peripheral edges including first and second opposing edges, wherein the first edge is a rounded edge formed by a curved surface that runs along the rounded edge and wherein the second edge forms a vertical sidewall; and
   attaching the light guide plate to a light-emitting diode substrate at the vertical sidewall such that light-emitting diodes on the light-emitting diode substrate emit light into the vertical sidewall opposite the rounded edge.

8. The method defined in claim 7 further comprising:
   with a polishing tool, polishing the rounded edge of the light guide plate.

9. The method defined in claim 8 wherein the polishing tool comprises a diamond edge polishing machine.

10. An electronic device, comprising:
    an electronic device housing;
    display layers mounted in the electronic device housing; and
    a light guide plate having opposing upper and lower surfaces and having four edges, wherein backlight illumination is provided to the display layers from the upper surface, wherein the upper surface comprises a curved surface that runs along at least one of the four edges, wherein the light guide plate comprises a plurality of alignment structures, and wherein the curved surface forms at least part of the alignment structures.

11. The electronic device defined in claim 10 wherein the curved surface has a radius of curvature of greater than 50 microns.

12. The electronic device defined in claim 10 further comprising:
    a plurality of optical films interposed between the display layers and the light guide plate.

13. The electronic device defined in claim 12 wherein the plurality of optical films comprises a diffuser layer adjacent to the upper surface of the light guide plate, wherein the curved surface curves away from the diffuser layer.

14. The electronic device defined in claim 10 wherein the curved surface of the light guide plate forms at least one rounded edge that extends from a first corner of the light guide plate to a second corner of the light guide plate.

15. The electronic device defined in claim 10 wherein the display layers comprise:
    a color filter layer;
    a thin-film transistor layer; and
    a liquid crystal layer interposed between the color filter layer and the thin-film transistor layer.

16. The electronic device defined in claim 10 wherein the lower surface of the light guide plate comprises light-scattering structures.

17. The electronic device defined in claim 10 wherein the plurality of alignment structures comprises at least first and second protrusions that protrude from one of the four edges of the light guide plate.

18. The electronic device defined in claim 17 wherein the first and second protrusions each comprise an opening.

* * * * *